Jan. 28, 1969　　　ISAO SATO　　　3,424,204
REINFORCED PAPER PIPE
Filed Oct. 27, 1964
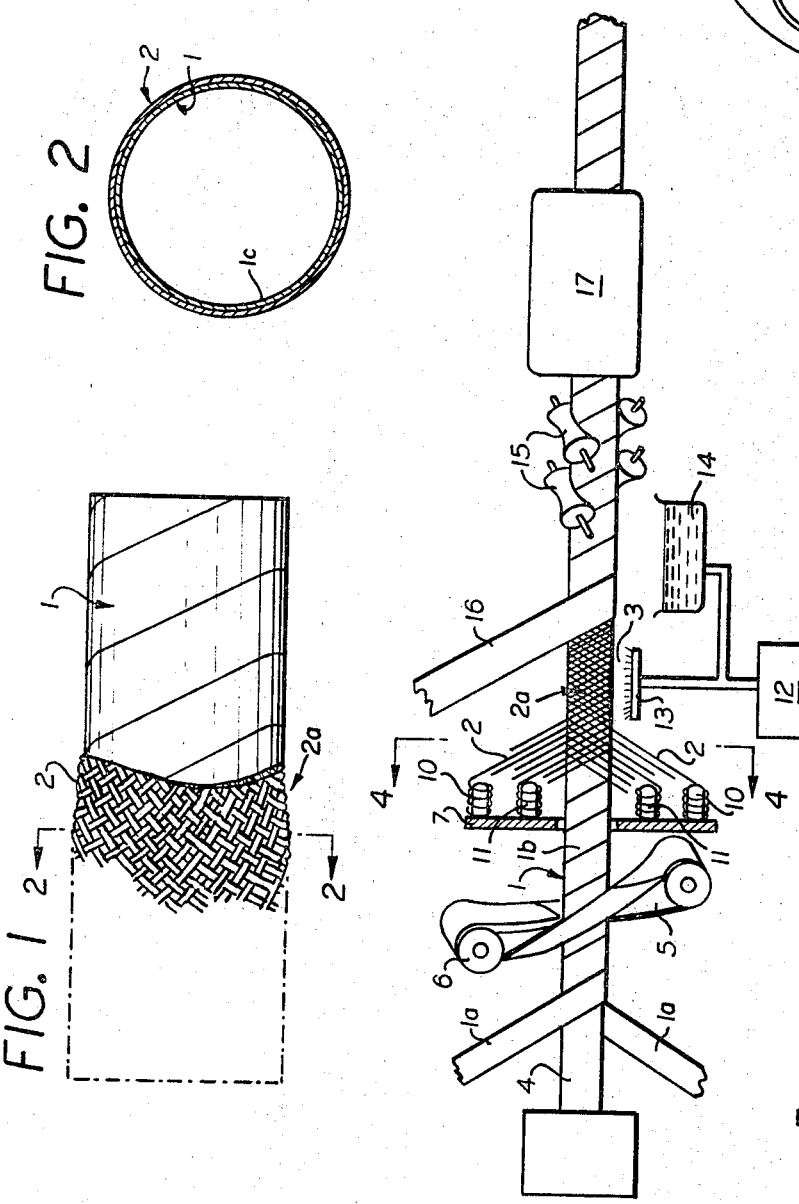
INVENTOR
ISAO SATO
BY
ATTORNEY.

United States Patent Office 3,424,204
Patented Jan. 28, 1969

3,424,204
REINFORCED PAPER PIPE
Isao Sato, 1127 Ishikiri-cho, Hiraoka, Osaka, Japan
Filed Oct. 27, 1964, Ser. No. 408,460
Claims priority, application Japan, Jan. 27, 1964,
39/3,878
U.S. Cl. 138—144                           9 Claims
Int. Cl. F16l *9/14, 11/02*

The present invention relates to pipes, in general, and to a light and rigid pipe which is primarily used as a bobbin or the like, in particular.

It is one object of the present invention to provide a pipe which is light, strong and inexpensive and which can be used not only as a bobbin, but also for various other purposes.

It is another object of the present invention to provide a pipe comprising a hollow inner paper core layer, a layer of knitted fiber yarn disposed about the paper core layer, which layer of knitted fiber yarn comprises a substantially spiral intertwined network, and a resin binder permeating the layers binding the layers together. The fiber yarn can be made of glass fibers or synthetic fibers and the resin binder is synthetic resin of the polyester type. Accordingly, there is provided a lighter, stronger and more alkali or acid resistant pipe, which is more rigid than conventional pipes. The pipe of the present invention may readily be manufactured and is less expensive than a conventional pipe. It can also be readily processed for joining with another pipe, for example, by cutting a screwthread therein.

With these and other objects in view which will become apparent in the following detailed description, the present invention will be clearly understood in connection with the accompanying drawing, in which:

FIGURE 1 is a side view of a pipe with the fiber yarn layer partly broken away in accordance with the present invention;

FIG. 2 is a section along the lines 2—2 of FIG. 1;

FIG. 3 is a diagrammatic view of the manufacture of another pipe in accordance with the present invention;

FIG. 4 is a section along the lines 4—4 of FIG. 3; and

FIG. 5 is a cross-sectional view of a variant pipe in accordance with the present invention.

Referring now to the drawing, and more particularly to FIGS. 1–3, glass fiber or synthetic fiber yarns 2 are knit together so as to form a fiber layer 2a which covers the outer peripheral surface of a helically wrapped paper core body layer 1 which is initially formed into a cylindrical shape as will hereinafter be described. Synthetic resin 3 of the polyester type (FIG. 3) permeates the glass or synthetic fiber layer 2a which is thereby adhered to the paper core body layer 1. The synthetic resin 3 fills the spaces between the fiber yarns 2 and sticks thereto to close the spaces, the synthetic resin 3 also adhering the fibers together.

Also, in accordance with the present invention, after the fiber layer 2a is adhered together, the fiber yarns 2 may be again knit over the paper core body layer 1 and then provided with synthetic resin to adhere together. As a variant, paper strips may again be wound over the fiber layer 2a, to form another paper layer 16, or the inner core body layer may be removed so as to complete the respective layers. Further, as shown in FIG. 5 an additional fiber layer 2a' may be knitted about the paper layer 16, the synthetic resin impregnating and binding the layers together.

Referring now again to the drawing, and more particularly to FIGS. 3–4, for manufacturing a pipe of the present invention, a mandrel 4 is selected having an outer diameter equal to the desired inner diameter of the pipe to be manufactured. Several paper tapes 1a are spirally wound on the mandrel 4, which tapes 1a are pressed so as to stick to the mandrel 4 by an endless belt 5 connected to a main winding pulley. The mandrel 4 is revolved and the paper tapes 1a move forwardly to cover, in helically overlapping relationship, the mandrel 4. Suitable adhesives may be coated on the respective paper tapes 1a, so that the paper tapes 1a will stick together due to the pressure of belt 5 at their overlapping edges 1b to form the paper core body layer 1. The innermost surface 1c (FIG. 2) of the paper core body layer 1 is provided with a lubricant, if necessary, so that the paper core body layer 1 can readily be removed from the mandrel 4 after manufacture.

The width of the respective paper tapes 1a is calculated according to the diameter of the mandrel 4 and the incident angle of the paper tapes 1a relative to the axis of the mandrel 4 so as to prevent the occurrence of any space or gap between the overlapping edges 1b of the paper tapes 1a in the paper core body layer 1.

A disk 7 is arranged perpendicularly to the core body layer 1 and revolves at the same speed and in the same direction as the core body layer 1. On the disc 7 are provided opposite undulated concave and convex grooves 8 and 9, respectively, (FIG. 4) which grooves cross and intersect each other. A required number of spools or reels 10 and 11 (e.g., eight shown in FIG. 4), are inserted into the grooves 8 and 9, respectively, so as to cause the reels 10 on one side to revolve clockwise and the reels 11 on the other side to revolve counter-clockwise on the disc 7. Accordingly, the fiber yarns 2 on the reels 10 and 11 are alternatively and uniformly knitted and intertwined upon the paper core body layer 1, so that the fiber yarns 2 form a substantially spiral oriented twill cover about the core body layer 1, which progresses forwardly together with the core body layer 1 during manufacture. The fiber yarns 2 can be made into a plain or one-sided fabric.

The fiber yarns 2 formed into the fiber layer 2a are adhered to the core body layer 1 by spraying thereon a polyester resin or epoxide resin 3. As shown in FIG. 3, the resin is initially disposed in a resin bath 14 and sprayed through a nozzle 13 onto the rotating fiber layer 2a, by an air compressor 12. The resin 3 permeates the fiber layer 2a between the spaces of the fiber yarns 2 and adjacent the paper layer 1. Dipping may also be used to apply the resins.

Surface treatment may be performed, if desired or necessary. For example, vinyl paper 16 may be spirally wound upon and about the fiber layer 2a in a manner similar to the winding of the paper strips 1a about the mandrel 4. The tension of the vinyl paper 16 resists the forward motion of the endless belt 5 and clamping pressure accordingly is applied to the fiber layer 2a as the vinyl paper 16 is wound thereon, thereby promoting the complete permeation of the resin 3 into the fiber layer 2a. A plurality of barrel-shaped rolls 15 is provided which revolves, pressing against the vinyl paper 16 to make the surface even.

To harden the resin and bond the layers, the composite structure is passed through a drying oven 17, the temperature of which is determined according to the winding speed of the tape and the characteristics of the resin 3.

The pipe is endlessly and continuously mass produced and cut into any required size, and then processed as merchandise. It is light and strong because the core body layer 1 is made out of paper, upon the surface of which is a spirally intertwined fiber yarn layer 2a, adhered by synthetic resin 3, providing a structurally solid, inexpensive pipe. A pipe of unusually strong characteristics for various uses is accordingly provided by the present invention without the necessity for longitudinally aligned fibers or strengthening rods, which heretofore were required for prior plastic reinforced pipes. The synthetic resin 3 can be colored, and accordingly the pipe can be beautifully designed and distinguished for particular applications and uses.

While I have disclosed several embodiments of the present invention, it is to be understood that these embodiments are given by example only and not in a limiting sense, the scope of the present invention being determined by the objects and the claims.

What I claim is:
1. A pipe comprising
   a hollow innermost paper core layer,
   a layer of knitted fiber yarn disposed about said paper core layer,
   said layer of knitted fiber yarn comprising exclusively a substantially spirally intertwined network extending along the length of said paper core layer, and
   a resin binder permeating said layer of knitted fiber yarn and binding said layer of knitted fiber yarn and said paper core layer together.
2. The pipe, as set forth in claim 1, wherein
   said innermost paper core layer comprises at least one elongated strip of paper spirally wound with overlapping edges.
3. The pipe, as set forth in claim 2, wherein
   said overlapping edges are glued together.
4. The pipe, as set forth in claim 1, wherein
   said hollow inner paper core layer is cylindrical.
5. The pipe, as set forth in claim 1, further comprising
   an outer layer of paper surrounding said layer of knitted fiber yarn and bonded thereto by said resin binder.
6. The pipe, as set forth in claim 5, further comprising
   a second layer of knitted fiber yarn disposed about said outer layer of paper and bonded thereto by said resin binder.
7. The pipe, as set forth in claim 5, wherein
   said outer layer of paper comprises a spirally wound strip of vinyl paper with overlapping edges.
8. The pipe, as set forth in claim 1, wherein
   said resin comprises synthetic resin of the polyester type, and
   said fiber yarn comprises glass fibers.
9. The pipe, as set forth in claim 1, wherein
   said resin comprises synthetic resin of the polyester type, and
   said fiber yarn comprises synthetic fibers.

References Cited

UNITED STATES PATENTS

| | | | |
|---|---|---|---|
| 2,877,150 | 3/1959 | Wilson | 138—144 XR |
| 2,969,812 | 1/1961 | Ganahl | 138—130 XR |
| 3,080,893 | 3/1963 | Craycraft | 138—144 XR |
| 3,127,910 | 4/1964 | Scott | 138—144 |
| 3,194,275 | 7/1965 | Bigg et al. | 138—144 |
| 3,007,497 | 11/1961 | Shobert | 138—125 |
| 1,312,780 | 8/1919 | Fenn | 138—144 |
| 2,001,569 | 5/1935 | Kiefer | 242—118.7 |
| 2,286,267 | 6/1942 | Farny | 138—153 XR |
| 2,854,031 | 9/1958 | Donaldson | 138—141 XR |
| 2,888,954 | 6/1959 | Gates | 138—137 |
| 2,945,638 | 7/1960 | Crawford et al. | 242—118.32 |
| 3,054,428 | 9/1962 | Crawford | 242—118.32 XR |

FOREIGN PATENTS 1,136,984  1/1957  France.

SAMUEL ROTHBERG, *Primary Examiner.*

B. KILE, *Assistant Examiner.*

U.S. Cl. X.R.

138—124